United States Patent
Briddell et al.

(10) Patent No.: US 6,297,324 B1
(45) Date of Patent: Oct. 2, 2001

(54) ADHESIVE COMPOSITION FOR PROVIDING WATER-TIGHT JOINTS IN SINGLE-PLY ROOFING MEMBRANES

(75) Inventors: Brian Jonathon Briddell; Dennis Keith Fisher; James Fredrick Wood, all of Jackson, MI (US)

(73) Assignee: Adco Products, Inc., Michigan Center, MI (US)

( * ) Notice: Subject to any disclaimer, the term of this patent is extended or adjusted under 35 U.S.C. 154(b) by 0 days.

(21) Appl. No.: 08/414,381

(22) Filed: Mar. 31, 1995

(51) Int. Cl.[7] ..................................................... C08L 47/00
(52) U.S. Cl. ........................ 525/237; 525/145; 525/154; 525/87
(58) Field of Search .................................. 525/237, 145, 525/154, 87

(56) References Cited

U.S. PATENT DOCUMENTS

| | | | |
|---|---|---|---|
| 4,198,254 | * 4/1980 | Laroche et al. | 156/107 |
| 4,404,056 | 9/1983 | Kakehi et al. | 156/249.11 |
| 4,461,875 | 7/1984 | Crepeau | 525/348 |
| 4,588,637 | 5/1986 | Chiu | 428/355 |
| 4,601,935 | 7/1986 | Metcalf et al. | 428/57 |
| 4,603,164 | 7/1986 | Chmiel et al. | 524/432 |
| 4,640,730 | 2/1987 | Streets et al. | 156/334 |
| 4,671,996 | 6/1987 | Cantor | 428/343 |
| 4,737,528 | 4/1988 | Musch et al. | 523/335 |
| 4,742,119 | 5/1988 | Close | 525/211 |
| 4,855,172 | 8/1989 | Chiu | 428/57 |
| 4,881,996 | 11/1989 | Nussbaum et al. | 156/157 |
| 5,234,987 | 8/1993 | Hubbard et al. | 524/505 |
| 5,242,727 | 9/1993 | Briddell et al. | 428/92 |
| 5,504,136 | 4/1996 | Davis et al. | 524/491 |

FOREIGN PATENT DOCUMENTS

| | | |
|---|---|---|
| 195273 | 2/1986 | (EP) . |
| 330089 | 2/1989 | (EP) . |

* cited by examiner

*Primary Examiner*—Peter D. Mulcahy
(74) *Attorney, Agent, or Firm*—Killworth, Gottman, Hagan & Schaeff, L.L.P.

(57) ABSTRACT

A cured adhesive tape composition for adhering together roofing materials such as synthetic EPDM rubber and which provides long term water tightness is provided. The adhesive composition includes a) a rubbery polymer comprising a blend of (i) from about 12% or less by weight of the total composition of an ethylene-propylene-diene terpolymer, (ii) a halogenated butyl rubber or a halogenated copolymer of p-methylstyrene and isobutylene, (iii) polyisobutylene, and (iv) a butyl terpolymer, and b) a compatible tackifier, and c) an accelerator/cure package for the rubbery polymer. The cured composition exhibits a peel strength of at least 1000 grams/cm at room temperature, at least 500 grams/cm at 70° C., and supports a static load of at least 300 grams at 70° C.

16 Claims, No Drawings

ADHESIVE COMPOSITION FOR PROVIDING WATER-TIGHT JOINTS IN SINGLE-PLY ROOFING MEMBRANES

BACKGROUND OF THE INVENTION

The present invention relates to a cured adhesive composition for providing a water-tight seal to joints of roofing membranes, and more particularly to a rubber based adhesive for joining sheets of EPDM rubber roofing material together.

Roofing materials for covering large roof areas are customarily prepared in wide sheets for installation. Elastomeric ethylene-propylene-nonconjugated diene terpolymer (EPDM) and isobutylene-conjugated diene copolymer (butyl rubber) compositions are well known in the art as roofing materials due to their barrier properties against moisture. These sheets must be overlapped and spliced together to form a continuous, water-tight sheet which covers a roof.

EPDM roof membranes are manufactured to industry standards which permit only a 2% shrinkage in any dimension. Much of the shrinkage is caused by tension when the sheet is calendared and wound on a core and cured. As the EPDM sheet is unwound it recovers, causing the shrinkage. The recovery or shrinkage is dependent on the amount of stress built in during processing (calendaring and winding). If the sheet recovers 2% in a 100 foot roll it will shrink two feet. Seams in EPDM membranes are typically 5 inches for adhesive glues and as narrow as 2.5 inches for tapes. After seaming is accomplished on the roof site, ensuing shrinkage could pull the seams apart if the tape lacks sufficient static load strength.

The first generation of tapes introduced to the industry were uncured compositions that contained curatives. Vulcanization was achieved only after extended exposure to high roof top temperatures. It has been witnessed in roof curing (in situ curing) tapes that sliding of the seam in the shear direction can occur before there is enough time for the adhesive to cure and gain sufficient strength to hold the rubber sheets, and thus the seam, intact.

Besides the normal shrinkage of the EPDM membrane, large variations in temperature can occur shortly after the roof is installed. If the EPDM membrane is seamed during the day while the EPDM membrane is hot, the contraction of the EPDM membrane when the temperature falls at night could result in early seam failure before the adhesive cures. In the spring or fall, the EPDM membrane temperature could change as much as 38° C. from night to day. During the manufacturing of EPDM sheeting stresses are built into the sheet as described above. When the sheet is subsequently rolled out on a roof surface, recovery occurs resulting in reduction in size. The amount of "shrinkage" that results determines the stress forces applied to the bonded seams.

Close, U.S. Pat. No. 4,472,119, is an example of an uncured roofing adhesive composition. The composition is taught to be applied as a liquid dissolved in a solvent. Example I shows a composition which is cured in situ for seven days after application to a roofing membrane. However, the prior art has recognized the shortcomings of such in situ cure adhesives. Chiu, U.S. Pat. No. 4,588,637, in the paragraph bridging columns 1 and 2, describes the problems with uncured adhesive tapes including low initial strengths. Metcalf, U.S. Pat. No. 4,601,935, also describes the shortcomings of in situ curable adhesives, including low initial strengths.

Another method used previously in the art for sealing together the overlapping sheets of roofing material has been to position an unvulcanized rubber tape between the overlapped portions of the roofing membranes and then spot vulcanizing the tape by the application of heat and pressure. However, this method required the presence of a vulcanizing press on the job site. Further, good adhesion required long vulcanizing times which slowed down the installation of the roofing materials.

Yet another method of sealing the overlapping sheets together has been the use of adhesives such as solvent-based polychloroprene (neoprene)-based adhesives. Problems have been encountered not only with the strength of the adhesive bonds formed at the splices, but also with the long term durability of those bonds. For example, environmental conditions may act to impair the quality of the bond achieved. If conditions are windy, dust and other contaminants may become lodged in the adhesive and impair its ability to adhere the sheets of roofing material together. If there are high temperatures, the adhesive may dry out too quickly. High humidity may cause moisture condensation which interferes with good adhesion. Variations in environmental conditions may require that the workers installing the roof modify their procedures, complicating the installation.

The use of brushes that leave streaks or coatings of uneven thickness are known to reduce bond strength. Polychloroprene (neoprene) adhesives contain solvents, usually aromatic, such as toluene, xylene, and others. Solvents are environmentally undesirable and subject to increasing regulation. They have toxicity and pose a health hazard. Finally, due to their flammability, a fire hazard exists, and there have been many instances in the industry where fires and injuries have occurred as a result of the use of solvent-based products.

Attempts have been made in the art to develop better adhesives which may be applied more readily and which provide a long term capability to withstand moisture; penetration. For example, Streets, U.S. Pat. No. 4,640,730, teaches the use of a styrene-butadiene block copolymer mixed with a hydrocarbon resin as an adhesive for EPDM end butyl rubber-based roofing materials. Chiu, U.S. Pat. Nos. 4,588,637 and 4,855,172, teach a roofing adhesive of a cured butyl rubber-based composition made by compounding a butyl rubber copolymer, a curing agent for the butyl ribber, carbon black, and a compatible tackifier.

Kakehi, U.S. Pat. No. 4,404,056, teaches a cold vulcanizable adhesive tape having a Mooiey viscosity of from 5 to 25 which includes a rubbery polymer, a vulcanizing agent, a vulcanizing accelerator, an adhesive agent, and a softening agent. The tape is positioned between overlapping sheets of roofing material, and the sheets are pressed together with a roller or the like.

Briddell et al, U.S. Pat. No. 5,242,727, teaches an EPDM-based adhesive composition. The composition comprises substantially equal amounts of a a) rubbery polymer comprising a blend of EPDM, halogenated butyl rubber or a halogenated copolymer of methylstyrene and isobutylene and polyisobutylene, and b) a compatible tackifier. The adhesives includes EPDM at levels of at least 16% and produces peel strengths at room temperature of from 700 to 985 grams/cm and peel strengths at 70° C. of from 300 to 375 grams/cm.

However, the need still remains in the art for effective adhesive compositions and methods of application for use in adhering together Sheet of EPDM-based roofing materials which provides not only ease of application and good strength, but also a long term water-tight seal.

SUMMARY OF THE INVENTION

The present invention meets that need by providing a precured adhesive composition for adhering together roofing materials such as synthetic EPDM rubbers and which provides long term water tightness. The adhesive is soft and initially tacky, yet possesses high initial strength at 70° C., at least in part due to the cured nature of the composition.

According to one aspect of the present invention, the adhesive composition includes a) a cured rubbery polymer comprising a blend of (i) an ethylene-propylene-diene terpolymer, (ii) a halogenated butyl rubber or a halogenated copolymer of p-methylstyrene and isobutylene, and (iii) polyisobutylene, and b) a compatible tackifier. Preferably, the tackifier is selected from the group consisting of polybutene, a phenolic resin, and mixtures thereof. The composition comprises 12% or less by weight of the total composition of the ethylene-propylene-diene terpolymer. Preferably, the composition comprises 6% or less of the ethylene-propylene-diene terpolymer and, most preferably, 1% or less of the terpolymer. The rubbery polymer may also contain a (iv) butyl terpolymer.

The composition further includes an accelerator/cure package for the rubbery polymer. The composition exhibits a peel strength of at least about 1000 grams/cm and, more preferably, at least about 1200 grams/cm at room temperature, at least about 500 grams/cm and, more preferably, at least about 650 grams/cm at 70° C., and supports a static load of at least 300 grams at 70° C., preferably for a minimum of 96 hours. The composition may further include a minor portion of carbon black and other conventional fillers and/or desiccants.

In a preferred form, the adhesive composition of the present invention includes: a) from about 30–45% of a rubbery polymer blend, b) from about 30–45% of a compatible tackifier, and c) from about 0.5–6% of an accelerator/cure package. The composition comprises 12% or less by weight of the total composition of an ethylene-propylene-diene terpolymer in the rubbery polymer blend. Preferably, the composition comprises 6% or less of the ethylene-propylene-diene terpolymer and, most preferably, 1% or less of the terpolymer. The composition is post-cured after extrusion and before use prior to provide a fully cured adhesive having high initial adhesivity and strength. For convenience, the adhesive composition of the present invention may be fabricated in the form of an extruded tape. The tape comprises a layer of cured adhesive composition in the form of a strip on a release liner, and if desired, wound in a roll. The adhesive tapes are typically about 6.0–18.0 cm wide and about 0.5–1.0 mm thick.

The present invention provides an adhesive tape composition which is easy to transport and store, has a long storage life, and can be easily applied at a job site. In use, the adhesive tape provides an initial high adhesion and forms a strong bond and water-tight seal between overlapping sheets of synthetic rubber roofing membrane material. The cured adhesive tape composition is comprised of a sufficiently high crosslink density to provide strong adhesive bonding to the sheets of rubber roofing materials through all widely known roof temperature extremes. The adhesive tape can be applied in a variety of weather conditions and is stable at elevated temperatures which may be encountered on roofs. The composition does not embrittle at low temperatures and remains sufficiently strong and flexible to withstand the expansion and contraction of the roof and underlying roofing materials without seal rupture.

Accordingly, it is an object of the present invention to provide a cured adhesive composition for use in adhering together sheets of EPDM-based roofing materials which provides not only ease of application and good strength, but also a long term water tight seal. This, and other objects and advantages of the invention will become apparent from the following detailed description and the appended claims.

DETAILED DESCRIPTION OF THE PREFERRED EMBODIMENT

By providing a cured adhesive composition which includes a rubbery polymer blend and a compatible tackifier, the composition of the present invention is soft and possesses an initial high adhesivity. This permits the formation of a strong initial bond between overlapping layers of roofing material. Additionally, the composition possesses high initial strength and static load resistance so that the joint which is formed remains water tight. Static load resistance is a measure of the adhesive composition's ability to resist expansion and contraction of the roofing membrane while maintaining a water tight seal. The composition may be provided as a preformed adhesive tape which provides ease of application at a job site.

The adhesive tape composition of the present invention preferably comprises, as the rubbery polymer component, a blend of an ethylene-propylene-diene terpolymer, a halogenated butyl rubber or a halogenated copolymer of p-methylstyrene and isobutylene, and polyisobutylene. For example, the ethylene-propylene-diene terpolymer may be Vistalon 2200, 2504, 5600, or 6505, commercial products available from Exxon Chemical Americas in Houston, Tex.; or Royalene 501, 502, 505, 512, or 521, commercial products available from Uniroyal Chemical Co. in Middlebury, Conn.; or KeHan 2506, 40A, or 4506, commercial products available from Copolymer Rubber and Chemical Corp. in Baton Rouge, La.; or Trilene 65 or 67, low molecular weight terpolymers commercially available from Uniroyal. The halogenated butyl rubber may be a compound such as Bromobutyl 2030 or X-2, or Chlorobutyl 1240 or 1255, commercial products available from Polysar, Inc. in West Haven, Conn.; or Bromobutyl 2222 or 2244, or Chlorobutyl HT-1065, HT-1066, or HT-1068, commercial products available from Exxon Chemical. The halogenated copolymer of p-methylstyrene and isobutylene may be a compound such as Bromo XP-50 commercially available from Exxon Chemical. The halogenated p-methylstyrene/isobutylene copolymer combines the low permeability properties of a butyl rubber with the environmental and aging properties of an EPDM rubber.

The adhesive composition includes 12% or less of ethylene-propylene-diene terpolymer. Preferably, the composition includes 6% or less and, more preferably, 1% or less of the terpolymer. Lower terpolymer quantities (including the absence of any terpolymer) in the adhesives of the present invention than in the prior art compositions surprisingly provided higher peel strengths as demonstrated in the examples below.

The polyisobutylene component of the composition may be, for example, Vistanex L-80, L-100, L-120, or L-140, commercial products available from Exxon Chemical; or Oppanol B-50 or B-100, commercial products available from BASF Corporation in Parsippany, N.J.; or a low molecular weight polyisobutylene such as LMMS or LMMH, commercial products available from Exxon Chemical; or Oppanol B-10 or B-15, commercial products available from BASF Corporation.

The adhesive composition may also contain a butyl terpolymer in the rubbery polymer component to provide the composition increased strength at elevated temperature. Butyl terpolymers are copolymers of isobutylene and isoprene which are pre-crosslinked during polymerization with divinylbenzene. For example, the butyl terpolymer may be XL-10000, XL-19106, XL-21306, XL-30102, XL-40302, XL-41106, XL-54006 or XL-68102, all of which are commercially available butyl terpolymer products from Bayer Polysar of Akron, Ohio.

The adhesive composition may also contain a compatible plasticizer for the rubbery polymer component. The plasticizer imparts softness to the composition. Suitable plasticizing agents include liquid polyisobutylene, for example Vistanex CP-24, LM-MS, LM-S, LM-MH, or LM-H, all of which are commercially available from Exxon Chemical; or Oppanol B-10, or B-15 both commercially available products from BASF Corporation; or paraffinic process oil, for example Flexon 815, Flexon 845, or Flexon 885 all commercially available from the Exxon Chemical Company or Sunpar 110, Sunpar 115, Sunpar 120, Sunpar 150 or Sunpar 2280 all commercially available from the Sun Refining and Marketing Company in Philadelphia, Pa., or Shellflex 210 or Shellflex 310 both commercially available from the Shell Chemical Company of Houston, Tex.; or naphthenic process oil for example Flexon 580, Flexon 641, Flexon 650, Flexon 660, Flexon 680, Flexon 766, or Flexon 785 all commercial products available from Exxon; or Shellflex 3211, Shellflex 3271, or Shellflex 3681 all commercially available from Shell Chemical and lastly, aromatic process oil, for example Flexon 391 from Exxon or Sundex 790 or Sundex 8125 from the Sun Oil Company.

The adhesive tape composition also contains a compatible tackifier in an amount substantially equal to the rubbery polymer. The tackifier gives the composition its softness and high initial adhesivity. Suitable tackifying agents include polybutene, for example Indopol H-100, H-300, H-1500, or H-1900, commercial products available from Amoco Chemicals Company in Chicago, Ill.; or Parapol 700, 950, 1300, 2200, or 2500, commercial products available from Exxon Chemical, phenolic resins such as Akron P-90 or P-133, commercial products available from Akrochem Corporation in Akron, Ohio; or SP-1068 or SP-1077, commercial products available from Schnectady Chemical, Inc. in Schnectady, N.Y.; or Durez 31671, a commercial product available from Occidental Chemical Corp. in N. Tonawanda, N.Y.; or Dyphene 8318 or 8320, commercial products available from Sherwin-Williams Company in Fords, N.J., and mixtures thereof.

The adhesive composition also includes an accelerator/cure package for the rubbery polymer component. The rubbery composition may be cured using any of several well-known curing systems including sulfur and sulfur-containing systems as well as zinc oxide. Typically, about 0.2 to about 2.0% by weight of curing agent in the composition is sufficient. The addition of a small amount of zinc oxide, 1–2% by weight, improves the high temperature stability of the composition as well.

Suitable curing accelerators for use in the present invention include sulfur, thiazoles, thiurams, and dithiocarbamates. For example, dipentamethylene thiuram hexasulfide, tetraethyl thiuram disulfide, tetramethyl/ethyl thiuram monosulfide, tetramethyl thiuram disulfide, tetramethyl thiuram monosulfide, 4,4' dithiodimorpholine, 2-(morpholinodithio)-benzothiazole, zinc dibutyl phosphorodithiate, 2-mercaptobenzo-thiazole, benzothiazyl disulfide, zinc mercaptobenzothiazole, zinc dibutyl dithiocarbamate, zinc diethyl dithiocarbamate, zinc dimethyl dithiocarbamate, copper dibenzyl dithiocarbamate or tellurium diethyl dithiocarbamate, and mixtures thereof, commercial products available from Akrochem, R.T. Vanderbilt Chemical Corp. in Bethel, Conn., Akzo Chemicals, Inc. in Cincinnati, Ohio, E.I. du Pont de Nemours and Company in Wilmington, Del., Mobay Corp. in Houston, Tex., Monsanto Chemical Company in St. Louis, Mo., Pennwalt Corp. in Buffalo, N.Y., or Uniroyal Chemical. Again, only small amounts of an accelerator are required. Typically from about 0.5 to about 2.0% by weight of accelerator in the composition is sufficient. The composition may further include a minor portion of carbon black and/or other conventional fillers or desiccants such as calcium oxide (lime).

The present invention also includes a method for adhering together sheets of synthetic rubber roofing materials which includes the steps of applying to at least one overlapping edge of the sheets a preformed cured pressure sensitive tape of the adhesive composition of the present invention. To form the adhesive tape, the adhesive composition is extruded onto a release liner. After extruding onto a release liner, the adhesive composition is heat cured to cure the rubbery polymer. Typically, the composition is heated to a temperature of about 100° C. to about 125° C. for a period of between about 2–6 hours to achieve essentially full crosslinking. Temperature limits have been established to protect the paper release liners used during cure. However, temperatures of 149° C. and above could be used if a heat resistant liner such as a polyester (Mylar) was used, thereby reducing the time required to obtain a proper degree of cure.

The pressure sensitive seaming tape is applied to a roof to hold together the roofing sheets. After application of the pressure sensitive seaming tape and removal of the release liner, the overlapping edges of the sheets are pressed together using firm pressure to insure good contact of tape to the sheet material. In a preferred embodiment, the overlapping surface of the sheets are first cleaned with a solvent to remove any traces of grease, oil, dusting agent, or other contaminants which could interfere with the formation of a water-tight seal. No primer need be applied to the sheet surface. However, certain properly formulated primer compositions are known to enhance bond formation and result in higher peel strengths.

All of the compositions of the present invention exhibit peel strengths of at least about 1000 grams/cm at room temperature and preferably at least about 1200 grams/cm at room temperature. In addition, the compositions exhibit peel strengths of at least about 500 grams/cm at 70° C. and preferably at least about 650 grams/cm at 70° C. Also, the compositions can support a static load of at least 300 grams at 70° C. All compositions of the present invention provide both high initial adhesion and high initial strength at 70° C. Without the high initial strength and adhesion, the joined, overlapped roofing materials could slip or be deformed such that the water tightness of the joint is destroyed. Further, because of the long term strength and flexibility, resistance to low temperature embrittlement, and high temperature stability of the adhesive, the joints which are formed remain water tight.

The compositions described above are fully vulcanized to achieve sufficient strength, adhesivity, and static load resistance. Full vulcanization is achieved when further exposure to elevated temperature does not change the adhesivity, strength, or static load resistance. Complete vulcanization enhances these performance properties. The compositions described above are blends of polymers that contribute to the proper balance of properties through its cure potential. Polyisobutylene rubber has no cure potential and thus acts as a polymer diluent. Halobutyl rubber has low to moderate cure capability due to its inherent low unsaturation level of under 2.5%. Ethylene propylene terpolymers have unsaturation levels as high as 10%. The cured blend must have sufficient strength to support a static load of at least 300 grams at 70° C., preferably for a minimum of 96 hours. A maximum of 6.0 mm of slippage with a 300 gram static load at 70° C. is considered acceptable performance. Excessive cure capacity in the composition reduces adhesivity and may result in seam failure. If the composition is not fully cured prior to application, further curing on the roof caused by elevated roof top temperatures may cause the tape to become too strong with accompanying loss of adhesivity.

In order that the invention may be more readily understood, reference is made to the following examples of compositions within the scope of the present invention, which examples are intended to be illustrative of the invention, but are not intended to be limiting in scope.

EXAMPLE 1

The compositions and amounts listed below were charged to a conventional double-arm sigma blade mixer and blended for a period of three hours. The resulting compositions were then extruded into an adhesive tape and cured at a temperature of 100° C. to 125° C. for 3 hours. The resulting compositions had a high initial adhesivity and were measured to have the peel strengths at room temperature and 70° C. and static load resistance at 70° C. reported below.

| Compound Description | Weight Percent (Based on 100% total composition) | | | | | | |
|---|---|---|---|---|---|---|---|
| | 1 | 2 | 3 | 4 | 5 | 6 | 7 |
| EPDM rubber | 10.5 | 4.5 | 0.0 | 0.0 | 0.0 | 8.9 | 6.0 |
| Halogenated butyl rubber | 19.1 | 25.1 | 29.6 | 28.9 | 28.3 | 14.3 | 14.3 |
| Butyl terpolymer | 0.0 | 0.0 | 0.0 | 0.0 | 0.0 | 6.0 | 8.9 |
| Polyisobutylene | 6.1 | 6.1 | 6.0 | 5.9 | 5.8 | 6.0 | 6.0 |
| Antioxidant | 0.2 | 0.2 | 0.1 | 0.1 | 0.1 | 0.1 | 0.2 |
| Phenolic resin | 10.8 | 10.8 | 11.1 | 10.9 | 10.6 | 10.9 | 10.9 |
| Zinc oxide | 1.3 | 1.3 | 1.3 | 1.3 | 1.3 | 1.4 | 1.4 |
| Pulverized time | 1.5 | 1.5 | 1.5 | 1.4 | 1.4 | 3.0 | 3.0 |
| Accelerator/Cure package | 2.2 | 2.2 | 2.2 | 2.2 | 2.1 | 0.8 | 0.8 |
| Carbon Black | 1.5 | 1.5 | 1.5 | 1.4 | 1.4 | 3.0 | 3.0 |
| Plasticizer | 6.1 | 6.1 | 6.0 | 5.9 | 5.8 | 1.9 | 1.9 |
| Polybutene tackifier | 40.7 | 40.7 | 40.7 | 42.0 | 43.2 | 43.7 | 43.6 |
| Physical Properties | | | | | | | |
| Static Load Resistance, 70° C., slippage (mm) 300 gram load | 2.0 | 2.0 | 1.0 | 2.0 | 3.0 | 2.0 | 2.0 |
| Peel strength, g/cm, 7 days at room temperature | 1448 | 1269 | 1859 | 2270 | 1877 | 1269 | 1340 |
| Peel strength, g/cm, 7 days at 70° C., pulled at 70° C. | 697 | 697 | 679 | 643 | 786 | 786 | 894 |

EXAMPLE 2

A test assembly was constructed to demonstrate how dramatic changes in rooftop temperatures can place very high stress on bonded EPDM seams. This test assembly comprised a 30 cm×30 cm board comprised of 12.7 cm plywood, two 15 cm×30 cm pieces of 1.1 mm thick EPDM sheeting, and clamps at each side of the board for securing the FPDM sheet in place.

A 30 cm×7.5 cm overlap seam was prepared using the adhesive compositions of in Example 1. The joined sheet was then conditioned for one hour at 70° C. The joined sheet was then stretched an additional 6 cm and clamped to the plywood board. This was accomplished with the seam positioned in the middle of the board and running parallel to the clamps.

The assembly was then conditioned at −18° C. After 24 hours the seam was examined for slippage or any sign of failure. The assembly was then cycled 10 times as follows: 2 hours at room temperature, followed by 2 hours at 70° C., followed by 24 hours at −18° C.

No evidence of failure was detected. It was concluded that the cured tape of the present invention possessed sufficient strength through the temperature extremes to prevent slippage and resulting seam failure.

EXAMPLE 3

A static load test was conducted in which 5.08 cm by 2.54 cm samples of EPDM membrane were cleaned and a 6.45 square cm area of tape was bonded using the compositions of in Example 1, leaving 2.54 cm tabs for clamping on each end. The assembly was suspended in a vertical position at 70° C. and a weight of 300 grams was attached. The assembly was evaluated over a period of 7 days to determine the amount of slippage. It was found that up to 300 grams in load produced no slippage.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A cured adhesive composition for adhering together EPDM roofing materials comprising a) a rubbery polymer comprising a blend of (i) from about 12% or less by weight of the total composition of an ethylene-propylene-diene terpolymer, (ii) a halogenated butyl rubber or a halogenated copolymer of p-methylstyrene and isobutylene, and (iii) polyisobutylene, and b) a compatible tackifier, said composition being fully vulcanized prior to use by heating to achieve essentially full crosslinking of the components, said composition having a peel strength of at least 1000 grams/cm at room temperature, at least 500 grams/cm at 70° C., and support a static load of at least 300 grams at 70° C.

2. The composition of claim 1 further including a minor portion of carbon black.

3. The composition of claim 1 in which said tackifier is selected from the group consisting of polybutene, a phenolic resin, and mixtures thereof.

4. The composition of claim 1 wherein said ethylene-propylene-diene terpolymer comprises about 6% or less by weight of the total composition.

5. The composition of claim 1 wherein said peel strength is at least about 1200 grams/cm at room temperature.

6. The composition of claim 1 wherein said peel strength is at least about 650 grams/cm at 70° C.

7. The composition of claim 1 wherein said rubbery polymer further comprises (iv) butyl terpolymer.

8. An adhesive composition for adhering together roofing materials comprising: a) from about 30–45% of a rubbery polymer, b) from about 30–45% of a compatible tackifier, c) from about 5–9% of a plasticizer, and d) from about 1–6% of an accelerator/cure package, the composition comprising about 12% or less by weight of the total composition of an ethylene-propylene-diene terpolymer in the rubbery polymer, the resulting composition being fully vulcanized prior to use by heating to achieve essentially full crosslinking of the components, said composition being cured sufficiently to support a static load of at least 300 grams at 70° C., and having a peel strength of at least 1000 grams/cm at room temperature and at least 500 grams/cm at 70° C.

9. The composition of claim 8 in which said rubbery polymer comprises a blend of an ethylene-propylene-diene terpolymer, a halogenated butyl rubber, and polyisobutylene.

10. The composition of claim 8 in which said rubbery polymer comprises a blend of an ethylene-propylene-diene terpolymer, a halogenated copolymer of p-methylstyrene and isobutylene, and polyisobutylene.

11. The composition of claim 8 in which said tackifier is selected from the group consisting of polybutene, a phenolic resin, and mixtures thereof.

12. The composition of claim 8 in which said plasticizer is liquid polyisobutylene.

13. The composition of claim 8 wherein said ethylene-propylene-diene terpolymer comprises about 6% or less by weight of the total composition.

14. The composition of claim 8 wherein said peel strength is at least about 1200 grams/cm at room temperature.

15. The composition of claim 8 wherein said peel strength is at least about 650 grams/cm at 70° C.

16. The composition of claim 8 wherein said rubbery polymer includes a butyl terpolymer.

* * * * *